United States Patent
Bryant (10) Patent No.: US 12,158,231 B2
(45) Date of Patent: Dec. 3, 2024

(54) COUPLING FOR VACUUM-INSULATED PIPING

(71) Applicant: Airbus Operations Limited, Bristol (GB)

(72) Inventor: Anthony Bryant, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 259 days.

(21) Appl. No.: 17/748,583

(22) Filed: May 19, 2022

(65) Prior Publication Data
US 2022/0373119 A1 Nov. 24, 2022

(30) Foreign Application Priority Data

May 20, 2021 (GB) .................................... 2107233

(51) Int. Cl.
*F16L 39/00* (2006.01)
*F02M 37/00* (2006.01)
*F16L 59/065* (2006.01)

(52) U.S. Cl.
CPC ....... *F16L 39/005* (2013.01); *F02M 37/0017* (2013.01); *F16L 59/065* (2013.01); *F16L 2201/30* (2013.01)

(58) Field of Classification Search
CPC ..... F16L 39/005; F16L 37/565; F16L 59/065; F16L 59/184; F16L 59/161; F16L 59/075; F16L 2201/20; F16L 2201/30; F02M 37/0017

See application file for complete search history.

(56) References Cited

U.S. PATENT DOCUMENTS

| | | | |
|---|---|---|---|
| 4,723,441 A * | 2/1988 | Sweeney | F16L 39/005 |
| 7,052,047 B1 | 5/2006 | Box et al. | |
| 7,399,002 B2 | 7/2008 | Motew et al. | |
| 7,533,850 B2 * | 5/2009 | Carns | F16L 39/005 |
| 2005/0166666 A1 * | 8/2005 | Tsukagoshi | |

(Continued)

FOREIGN PATENT DOCUMENTS

| | | |
|---|---|---|
| CN | 104048124 | 9/2014 |
| CN | 203847862 | 9/2014 |

(Continued)

OTHER PUBLICATIONS

EP-1598485-A3—Machine Translation—English (Year: 2006).*
GB Search Report for GB2107233.5, issued on Feb. 14, 2022 (1 page).

*Primary Examiner* — William S. Choi
(74) *Attorney, Agent, or Firm* — Nixon & Vanderhye P.C.

(57) ABSTRACT

A coupling for connecting vacuum-insulated piping is disclosed. The coupling facilitates the detection of unwanted fluid ingress into the low pressure insulating outer portion of the vacuum-insulated piping and the detection of a leak from the central portion of the vacuum-insulated piping that is used to carry cold fluids. This is achieved by providing a first leak path from the central portion of the vacuum-insulated piping to a sensor outlet and a second leak path from the outer portion of the vacuum-insulated piping to the sensor outlet. One sensor may be used to detect unwanted fluid ingress into the low pressure insulating outer portion and also detect a leak from the central portion of the vacuum-insulated piping.

16 Claims, 6 Drawing Sheets

(56) References Cited

U.S. PATENT DOCUMENTS

2009/0127848 A1 5/2009 Carns et al.
2014/0305517 A1* 10/2014 Adler
2021/0071795 A1 3/2021 Umemura et al.

FOREIGN PATENT DOCUMENTS

| CN | 106499893 | 3/2017 | |
| EP | 1 619 436 | 1/2006 | |
| EP | 1598485 A3 * | 11/2006 | ............ F16L 59/065 |
| EP | 2 058 573 | 5/2009 | |
| EP | 3 734 133 | 11/2020 | |
| KR | 10-2008-0113756 | 12/2008 | |

* cited by examiner

COUPLING FOR VACUUM-INSULATED PIPING

CROSS RELATED APPLICATION

This application claims priority to United Kingdom Patent Application GB 2107233.5, filed May 20, 2021, the entire contents of which is hereby incorporated by reference.

BACKGROUND OF THE INVENTION

The present disclosure relates to couplings for coupling vacuum-insulated piping.

The present invention concerns couplings for coupling vacuum-insulated piping. More particularly, but not exclusively, this invention concerns a coupling for vacuum-insulated piping. The invention also concerns a kit for forming a coupling, first and second parts for forming such a coupling, a vacuum-insulated piping arrangement, a fuel-delivery arrangement and a vehicle comprising a vacuum-insulated piping arrangement and/or a fuel-delivery arrangement.

Rigid couplings in vacuum insulated piping (also known as 'Vacuum Jacketed' or 'Super Insulated') are typically based on plain bolted flanges with compressible seals, clamped V-flanges with compressible seals, or vacuum insulated 'bayonet' couplings.

Vacuum-insulated pipes are double-walled pipes that are typically used to carry cold fluids (typically liquids). The cold fluid is carried in a central conduit. An outer, annular low-pressure region surrounds the central conduit, and provides thermal insulation for the central conduit. In certain cases, air is removed from the pipe to provide the low-pressure region during pipe manufacture. In other cases, air may be continuously removed from the pipe using a vacuum pump to provide the low-pressure region. Sections of pipe are typically connected together using a two-part pipe coupling, which may comprise plain bolted flanges with compressible seals, clamped V-flanges with compressible seals, or vacuum insulated 'bayonet' couplings.

Leaks are, of course, undesirable in either the central conduit or the low-pressure region. Leaks from the central conduit will cause loss of the cold fluid being carried in the pipe. Leaks in the low-pressure region will cause an increase in pressure in the low-pressure region, reducing the thermal insulation properties of the low-pressure region.

It is therefore important to sense for leaks in the central conduit and the low-pressure region. This is typically performed using a first sensor to sense for leaks in the central conduit and a second sensor to sense for leaks in the low-pressure region. On a long pipe installation comprising several pipe sections, this configuration leads to a large number of sensors and associated electrical, optical or pneumatic connections and routings.

The present invention seeks to mitigate one or more of the above-mentioned problems. Alternatively or additionally, the present invention seeks to provide an improved coupling for vacuum-insulated piping.

SUMMARY OF THE INVENTION

The present invention provides a coupling for vacuum-insulated piping, the coupling comprising:
first and second parts for forming the coupling,
a first seal member for forming a seal between the first and second parts,
each of the first and second parts comprising an inner portion for connection to an inner part of a vacuum-insulated pipe and an outer portion for connection to an outer, low pressure part of a vacuum-insulated pipe,
the inner portions of the first and second parts being suitable for forming an inner region for the passage of fluid therethrough,
the outer portion of the first part defining a first outer region and the outer portion of the second part defining a second outer region;
a sensor outlet for a leak detection sensor;
a first flow path for permitting flow of fluid from the inner region to the sensor outlet in the event of failure of the first seal member; and
a second flow path for permitting flow of fluid from the first outer region or the second outer region to the sensor outlet in the event that the pressure in said first or second outer region is greater than a predetermined pressure, the second flow path being provided with a non-return valve for permitting flow of fluid from the respective first outer region or the second outer region to the sensor outlet in the event that the pressure in said first or second outer region is greater than a predetermined pressure, and inhibiting flow of fluid from the sensor outlet to the respective first or second outer region in the event that the pressure in said respective first or second outer region is at or below a predetermined pressure.

The applicant has discovered that it is beneficial to provide flow paths from both the low pressure insulating region of a coupling and the fluid-carrying inner region of the coupling to the same sensor outlet, thereby facilitating the use of one sensor to sense for a leak in the coupling and for an undesirable increase in pressure in the insulating region.

Those skilled in the art will realise that the use of "vacuum" in relation to the coupling of the first invention does not mean that there is an absolute vacuum in a pipe or region. Those skilled in the art will realise that "vacuum" refers to a low pressure, sufficiently low to provide thermal insulation to the fluid-carrying region to inhibit unwanted heating of the fluid and unwanted cooling of the surroundings.

Those skilled in the art will realise that the leak detection sensor is not part of the coupling of the first aspect of the invention.

Those skilled in the art will realise that at least part of the first flow path and the second flow path may be common to one another. For example, the first and second flow paths may converge at a junction, with a conduit extending from said junction to the sensor outlet.

The first or second part of the coupling may be provided with one or more of the first flow path, second flow path and the sensor outlet. The first part or second part of the coupling may be provided with two or more of the first flow path, second flow path and the sensor outlet. The first part or second part of the coupling may be provided with the first flow path, the second flow path and the sensor outlet. It has proved to be beneficial for the first flow path, second flow path and the sensor outlet to be provided in the first or the second part of the coupling.

The first flow path may comprise a continuous channel, such as an annular channel. Such a channel may be a perimetric channel in that it extends around the perimeter of the first seal member. The continuous channel may extend, in use, around the first seal member. The continuous channel may be located outward from the first seal member. In the event that the first seal member were to fail, fluid from the inner region would leak outwardly past the first seal member. The continuous channel also facilitates the monitoring for leaks around the entire perimeter of the first seal member. In the event that the coupling is provided with a second seal member, the continuous channel may be located outward from the first seal member and inward of the second seal member. The first flow path, and the continuous channel, if present, is optionally provided in the first or second part that is not provided with the first seal member. For example, if the first part of the coupling is provided with the first seal member, then optionally, the second part of the coupling may be provided with the continuous channel of the first flow path.

The first flow path may comprise a connecting channel that forms a flow path from the continuous channel to the sensor outlet. The connecting channel may extend away from, and/or may extend normal to, the continuous channel.

The second flow path may optionally be provided in the first or second part of the coupling that is not provided with the first seal member. For example, if the first part of the coupling is provided with the first seal member, then optionally, the second part of the coupling may be provided with the second flow path.

The second flow path may comprise a conduit that forms a flow path to the sensor outlet. The non-return valve may be located in the fluid flow path provided by the conduit. The second fluid flow path may comprise an inlet for the passage of fluid from the respective first or second first outer region. The non-return valve may be located proximate the inlet.

The first and second flow path may meet at a junction. If the first flow path comprises a connecting channel and the second flow path comprises a conduit as described above, then the connecting channel and the conduit may meet at a junction. A sensor channel may form a flow path from the junction to the sensor outlet.

A buffer reservoir may be provided in one or both of the first and second flow paths. Those skilled in the art will realise that seal members are not perfect and sometimes permit a small and acceptable amount of leakage therepast. In certain circumstances, such an acceptable leak past the first seal member may be sensed by the sensor, and indicate the presence of a leak. This is undesirable, and the provision of a buffer reservoir in the flow path between the first seal member and the sensor outlet may be desirable. Such a buffer reservoir would effectively contain the small amount of fluid that leaks past the first seal member in the event of a "normal" and acceptable leak, and would prevent a rise is pressure that would be sensed by a sensor. A buffer reservoir may be any suitable shape. For example, the buffer reservoir may comprise a convoluted conduit. Alternatively or additionally, the buffer reservoir may comprise an expanded region. Such an expanded region optionally has a greater dimension than an adjacent conduit in a direction normal to the longitudinal axis of the conduit. The buffer reservoir may comprise a chamber, such as a cylindrical chamber.

If the coupling comprises a sensor channel, the sensor channel may be provided with a buffer reservoir.

The coupling may be provided with a second seal member for forming a seal between the first and second parts. The second seal member may be provided in the first or the second part that is provided with the first seal member. One or both of the first and second seal member may be annular. The first and second seal member may be concentrically arranged with respect to one another. The second seal member is optionally outward of the first seal member (the first seal member being an inner seal member and the second seal member being an outer seal member). The second seal member may be for containing a leak in the event of the failure of the first seal member.

One or both of the first and second parts of the coupling may comprise an inner pipe portion for forming a connection with an inner pipe of a vacuum-insulated pipe. The inner pipe portion is optionally circular in cross-section. One of the first and second parts of the coupling may be provided with a recess for receiving an inner pipe portion of the other of the first and second parts of the coupling. The recess may facilitate mating of the first and second parts of the coupling.

One or both of the first and second parts of the coupling may comprise an outer pipe portion for forming a connection with an outer pipe of a vacuum-insulated pipe. The outer pipe portion is optionally circular in cross-section.

The coupling is optionally made from materials able to withstand extreme cold. For example, the first seal element and second seal element (if present) may be cryogenic seals.

According to a second aspect of the invention there is also provided a kit of parts for forming a coupling in accordance with the first aspect of the present invention, the kit comprising the first and second parts for forming a coupling and a first seal member for forming a seal between the first and second parts.

The kit of the second aspect of the invention may comprise those features described above in relation to the coupling of the first aspect of the present invention. For example, the first and second parts of the coupling may comprise those features described above in relation to the coupling of the first aspect of the present invention.

For example, the kit may comprise a second seal member for forming a seal between the first and second parts.

The kit may comprise a sensor.

According to a third aspect of the invention, there is also provided a first part for forming a coupling in accordance with the first aspect of the present invention. The first part of the third aspect of the present invention may comprise those features described above in relation to the coupling of the first aspect of the present invention.

According to a fourth aspect of the invention, there is also provided a second part for forming a coupling in accordance with the first aspect of the present invention. The second part of the fourth aspect of the present invention may comprise those features described above in relation to the coupling of the first aspect of the present invention.

According to a fifth aspect of the invention, there is also provided a coupling for vacuum-insulated pipes, the coupling comprising a first coupling part and a second coupling part that couple together to provide the coupling, the first coupling part comprising a first central fluid-carrying space and a first outer space around the first central fluid-carrying space and for forming a thermally-insulating low-pressure region, the second coupling part comprising a second central fluid-carrying space around the second central fluid-carrying space and for forming a second outer space for forming a thermally-insulating low-pressure region, the first and second central fluid-carrying spaces forming a passage for the flow of fluid therethrough when the first and second parts of the coupling are brought together, the coupling comprising a seal between the first and second parts of the coupling and for inhibiting egress of fluid from the passage, the first part of the coupling comprising a low-pressure leak detection path from the first outer space to a sensor outlet, a valve being provided in the low-pressure leak detection path for permitting fluid to flow from the first outer space to the sensor outlet in the event that the pressure in the first outer space exceeds a predetermined value;

the first part of the coupling comprising a seal failure leak detection path to the sensor outlet for detecting failure of the seal.

According to a sixth aspect of the present invention, there is provided a vacuum-insulated pipe comprising a first or second part in accordance with the third or fourth aspects of the present invention. The vacuum-insulated pipe may comprise more than one of said first and/or second parts. Such first and/or second parts are located at pipe outlets/inlets, and therefore may be located at the ends of a pipe. For example, a vacuum-insulated pipe may comprise two first parts, two second parts, or a first part and a second part.

According to a seventh aspect of the invention, there is also provided a vacuum-insulated piping arrangement comprising two portions of vacuum-insulated piping connected by a coupling in accordance with the first aspect of the present invention, or two connected pipes in accordance with the sixth aspect of the present invention.

The vacuum-insulated piping arrangement may comprise a sensor connected to the sensor outlet of the coupling.

The vacuum-insulated piping arrangement may comprise a multiplicity of portions of vacuum-insulated piping and a plurality of couplings in accordance with the first aspect of the present invention.

Thermal insulation may be provided around the piping to inhibit heating of the contents of the piping arrangement.

According to an eighth aspect of the present invention, there is provided a fuel delivery arrangement comprising one or more fuel tanks configured to deliver fuel to an engine or motor through a vacuum-insulated piping arrangement according to the sixth aspect of the present invention. The fuel may be a liquefied gas, such as hydrogen.

According to an ninth aspect of the present invention, there is provided a vehicle comprising a vacuum-insulated piping arrangement in accordance with the sixth aspect of the present invention and/or a fuel delivery arrangement according to the seventh aspect of the present invention. The vehicle may be land-based vehicle, such as an automobile, van, truck, lorry, bus, motorbike, tram or train. The vehicle may be an aircraft, such as a fixed-wing aircraft or a rotary aircraft.

Although the invention has been described above mainly in the context of a fixed-wing aircraft application, it may also be advantageously applied to various other applications, including but not limited to applications on vehicles such as helicopters, drones, trains, automobiles and spacecraft.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
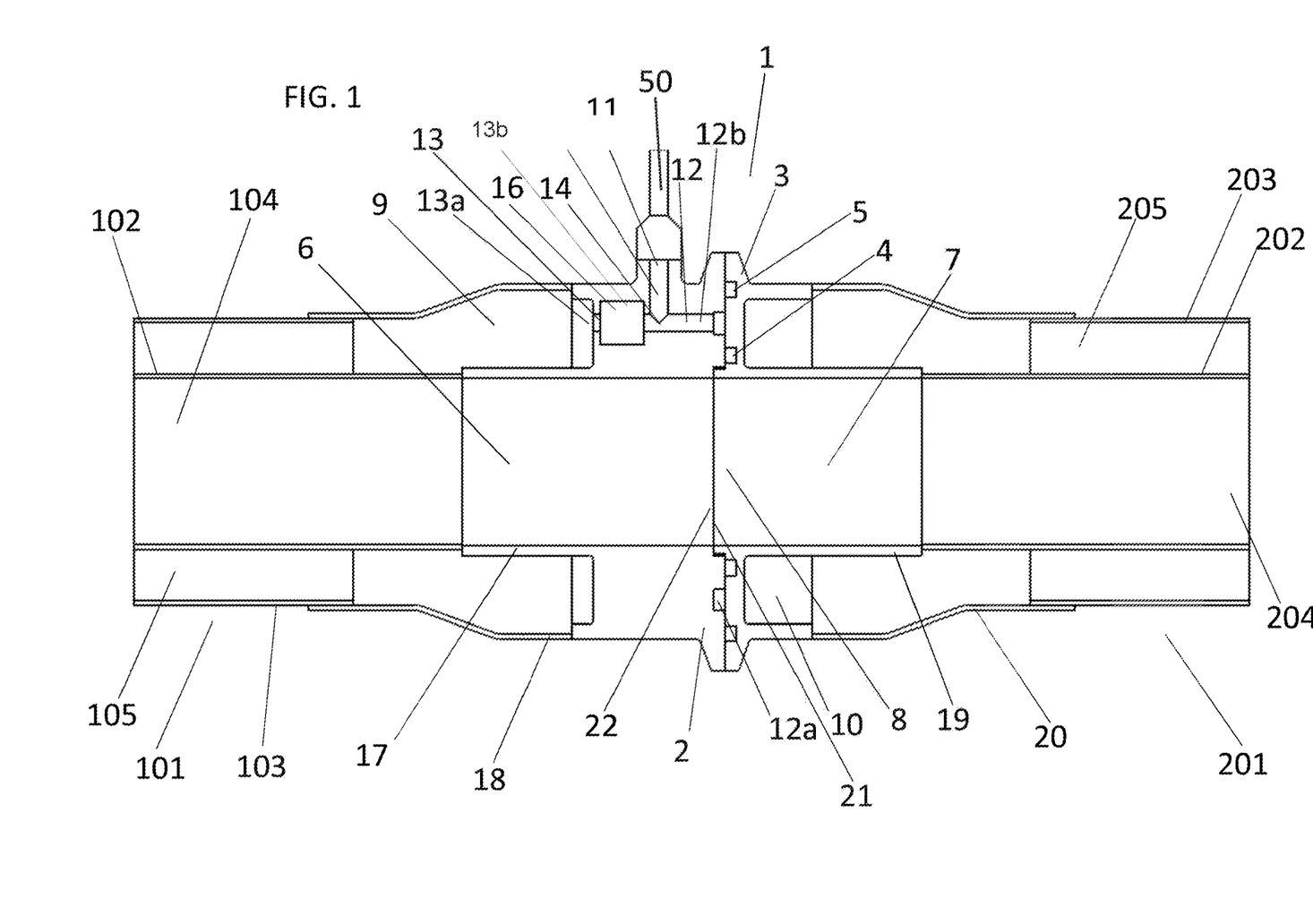
FIG. 1 shows a sectional view through an example of a coupling of a first embodiment of the invention.
Figure 2:
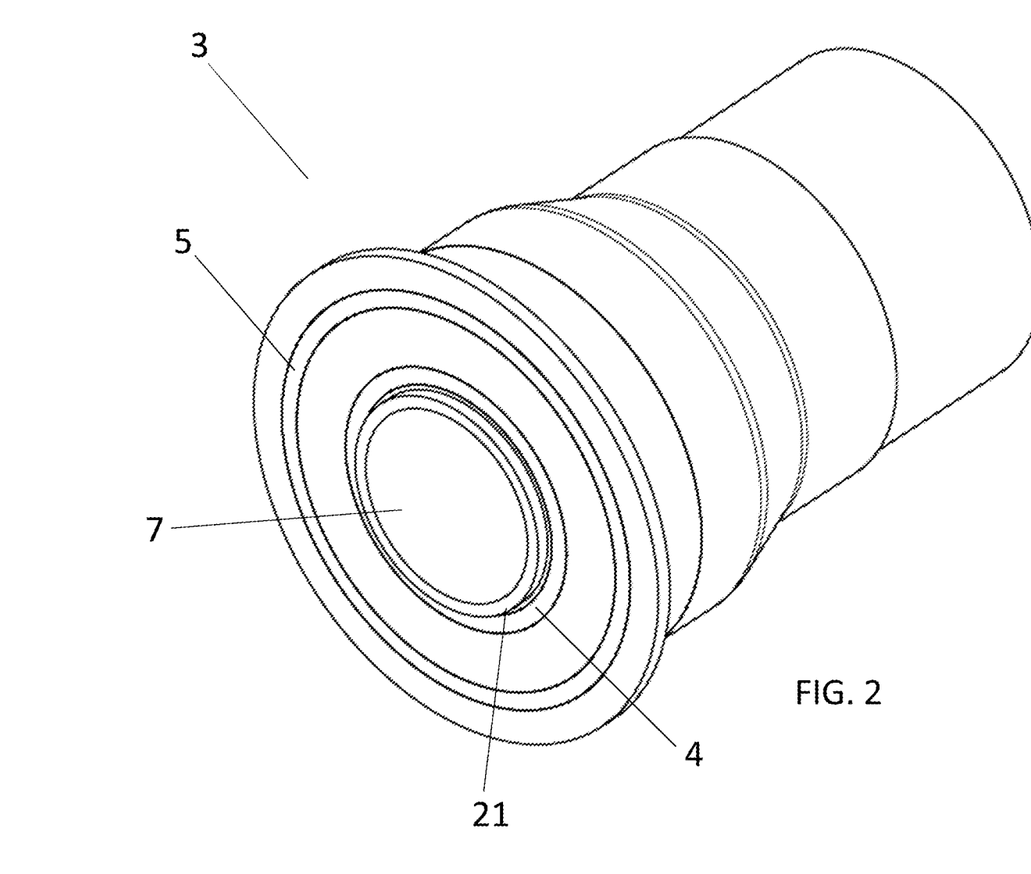
FIG. 2 shows a perspective view of the first part of the coupling shown in FIG. 1.
Figure 3:
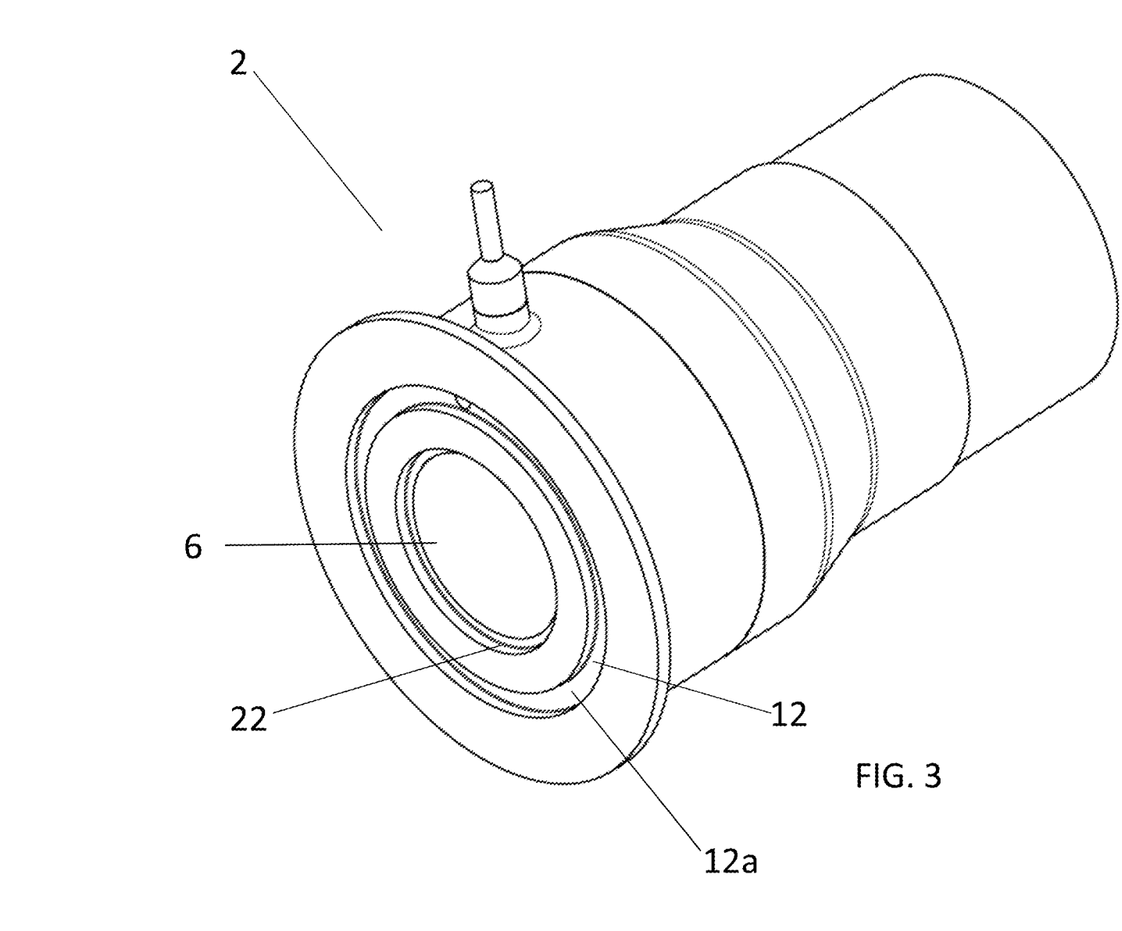
FIG. 3 shows a perspective view of the second part of the coupling shown in FIG. 1.

An example of an embodiment of a coupling in accordance with the present invention will now be described by way of example only with reference to FIGS. 1, 2 and 3. The coupling is denoted generally by reference numeral 1, and comprises first 2 and second 3 parts for forming the coupling. The first and second parts are made from stainless steel. The coupling 1 is used to form a connection between first pipe 101 and second pipe 201. First 101 and second 201 pipes are vacuum-insulated pipes. In this connection, first pipe 101 comprises an inner pipe 102 that defines an inner conduit 104 for carrying a cold fluid, and an outer pipe 103 that defines an outer space 105 between the outer pipe 103 and the inner pipe 102. Similarly, second pipe 201 comprises an inner pipe 202 that defines an inner conduit 204 for carrying a cold fluid, and an outer pipe 203 that defines an outer space 205 between the outer pipe 203 and the inner pipe 202. Outer spaces 105, 205 are low-pressure spaces that provide thermal insulation for the fluid carried in inner conduits 104, 204. Furthermore, the outer spaces and the associated pipes help contain any leaks that may occur due to failure of a first seal member 4 that forms a seal between the first 2 and second 3 parts of the coupling 1.

The first part 2 of the coupling 1 comprises an inner pipe portion 17 that connects to inner pipe 102 of first pipe 101, connecting inner portion 6 of the first part 2 with inner conduit 104 of the first pipe 101. Similarly, the second part 3 of the coupling 1 comprises an inner pipe portion 19 that connects to inner pipe 202 of second pipe 201, connecting inner portion 7 of the second part 3 with inner conduit 204 of the second pipe 201. The inner portions 6, 7 form an inner region 8. A flow path for cold fluid is thereby provided from the first pipe 101, through the coupling 1 and into the second pipe 201.

The first part 2 of the coupling 1 comprises an outer pipe portion 18 for connecting with outer pipe 103 of first pipe 101, the outer pipe portion 18 defining a first outer region 9. First outer region 9 forms part of the low-pressure space that provides thermal insulation for the cold fluid carried in the inner pipe 102.

The second part 3 of the coupling 1 comprises an outer pipe portion 20 for connecting with outer pipe 203 of second pipe 201, the outer pipe portion 20 defining a second outer region 10. Second outer region 10 forms part of the low-pressure space that provides thermal insulation for the cold fluid carried in the inner pipe 202.

First 9 and second 10 outer regions are typically at a low pressure. This is achieved by evacuating the outer spaces 105, 205, using methods well known to those skilled in the art.

It is desirable to monitor for the leakage of cold fluid from the first 101 and second 102 pipes. In this connection, the coupling 1 comprises a first flow path 12 for permitting flow of fluid from the inner region 8 of the coupling to a sensor outlet 11 in the event of failure of the first seal member 4 that forms a seal between the first 2 and second 3 parts of the coupling. The first seal member 4 is an annular seal for use with cryogenic fluids, and is located outwardly from the inner region 8 of the coupling. The first seal member 4 is carried by the second 3 part of the coupling 1. If the seal member 4 fails, then fluid flows through the first flow path 12 to a sensor 50 located at the sensor outlet 11. At some point along the first flow path 12, the fluid typically evaporates from a liquid to a gas. The sensor 50 detects the increase in pressure associated with the flow of gas along the first flow path 12. First flow path 12 comprises an annular channel 12a formed in the surface of the first part 2 of the coupling. Annular channel 12a is located outwardly of the first seal member 4. Therefore, if there is a failure of the annular first seal member 4 at any point around the seal member 4, then fluid will enter annular channel 12a. First flow path 12 also comprises a connecting channel 12b that extends orthogonally away from the annular channel 12a. The connecting channel 12b is in fluid communication with sensor channel 15 that is in fluid communication with sensor outlet 11.

It is also desirable to monitor the pressure in the low-pressure outer region 9. In this connection, the coupling comprises a second flow path 13 for fluid communication between the first outer region 9 and the sensor outlet 11. The second flow path 13 is provided with a non-return valve 16 for permitting flow of fluid from the first outer region 9 to the sensor outlet 11 in the event that the pressure in the first outer region 9 is greater than a predetermined pressure. In this case, the non-return valve is a piston seal valve. Therefore, if a leak were to develop in the outer space 105 of first pipe 101, the pressure in outer space 105 and first outer region 9 would increase. If the pressure were to increase to a pressure greater than a pre-determined pressure, the non-return valve would permit fluid to flow to the sensor outlet 11, and the change in pressure would be detected by sensor 50.

The second flow path 13 comprises inlet 13a and conduit 13b. The second flow path 13 meets with the connecting channel 12b of first flow path 12 at a junction 14. Sensor channel 15 extends from junction 14 to sensor outlet 11. Such an arrangement permits a single sensor 50 to sense for leaks in both a low pressure region and a cold fluid carrying region of a vacuum-insulated pipe.

For the avoidance of doubt, the non-return valve 16 inhibits flow of fluid from the sensor outlet 11 to the first outer region 9 in the event that the pressure in said first outer region 9 is at or below a predetermined pressure. Furthermore, the non-return valve 16 therefore prevents gas from flowing into the low-pressure region from the sensor outlet 11, for example, in the event of an increase in pressure resulting from a failure of seal member 4.

A second seal member 5 in the form of an annular, cryogenic-compatible ring is provided. The second seal member is located outwardly of annular channel 12a. The second seal member 5 helps to contain any leak that occurs due to failure of the first seal member 4. Furthermore, the containing of any such leak by the second seal member 5 facilitates the detection of the leak by the sensor.

The second part 3 is provided with an annular projection 21 that is received within circular recess 22 provided by first part 2. This male-female arrangement facilitates simple relative arrangement of the first 2 and second 3 parts of the coupling 1.

Figure 5:
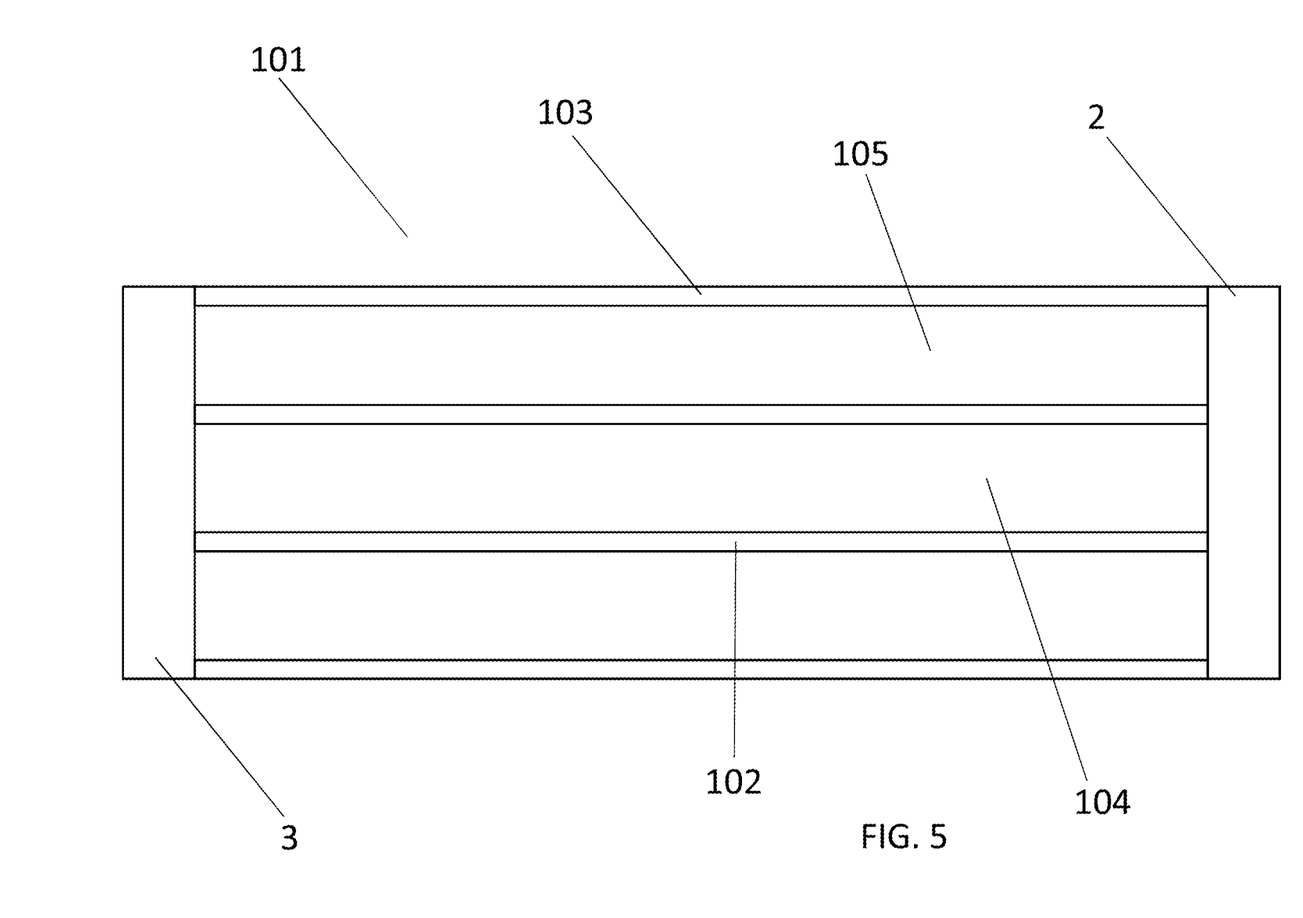
FIG. 5 shows a schematic view of an example of a vacuum-insulated pipe in accordance with an embodiment of the invention.

As mentioned above, first part 2 of coupling 1 is attached to first pipe 101 and second part 3 of coupling 1 is attached to second pipe 201. A schematic view of first pipe 101 is shown in FIG. 5. First pipe 101 comprises inner 102 and outer 103 pipes, as described above in relation to FIGS. 1, 2 and 3. First pipe 101 comprises a first part 2 of coupling 1, as shown on the right hand side of FIG. 5. The first part 2 of coupling 1 will form a coupling 1 with a second part 3 of coupling 1, as described above in relation to the coupling of FIGS. 1, 2 and 3. First pipe 101 comprises a second part 3 of a coupling, as shown on the left hand side of FIG. 5. The second part 3 will form a coupling with a first part 2 attached to another pipe.

Figure 6:
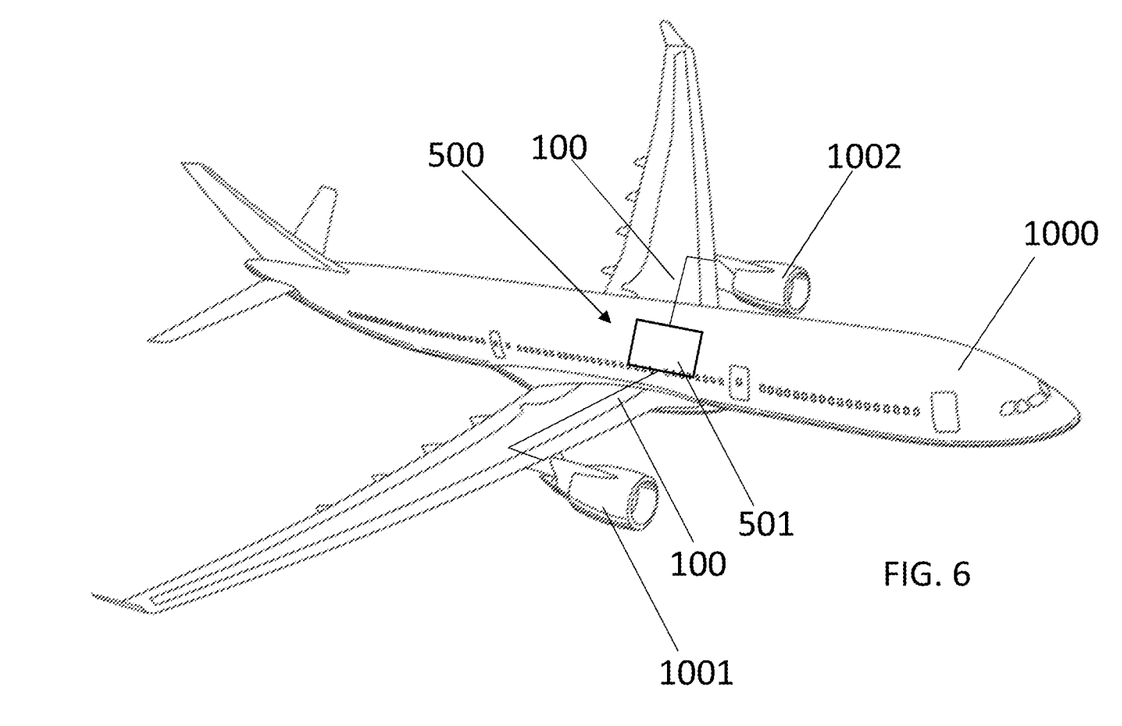
FIG. 6 shows a schematic representation of an example of a fuel delivery arrangement and an aircraft in accordance with an embodiment of the invention.

An example of an embodiment of a fuel delivery arrangement 500 and a vehicle 1000 (in this case, a fixed wing aircraft) in accordance with the present invention will now be described with reference to FIG. 6. The fuel delivery arrangement 500 comprises a fuel tank 501 configured to deliver fuel to two aircraft engines 1001, 1002 through two vacuum-insulated piping arrangements 100. Each vacuum-insulated piping arrangement 100 comprises a first 101 and a second 201 pipe coupled by a coupling 1, as described above in relation to FIGS. 1, 2 and 3. The fuel tank 501 stores liquefied hydrogen, which is transferred to engines 1001, 1002 through piping arrangements 100.

Figure 4:
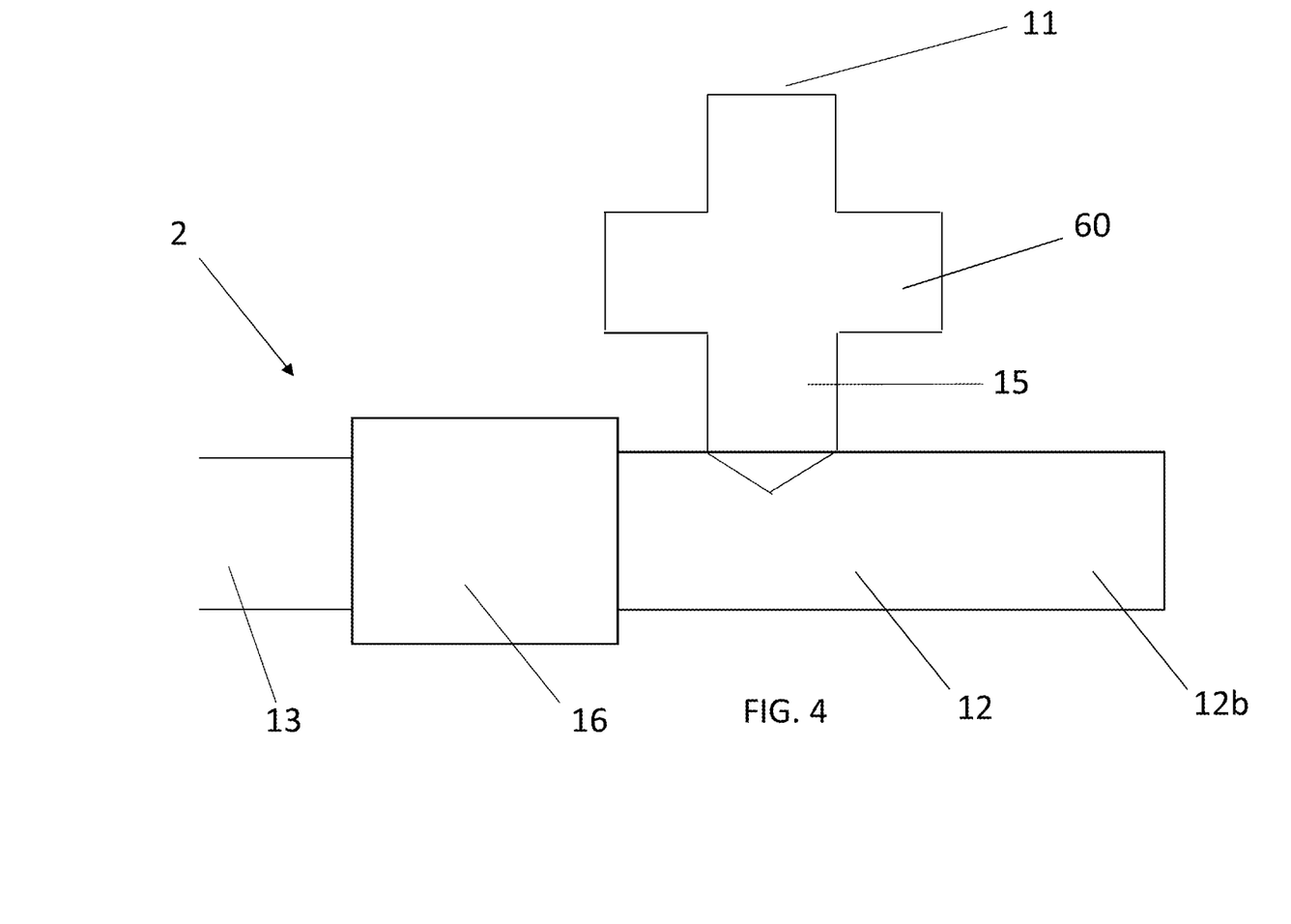
FIG. 4 shows a schematic sectional view of a portion of a first part of an example of an embodiment of a coupling in accordance with the present invention.

A further example of an embodiment of a coupling in accordance with the present invention will now be described with reference to FIG. 4. A small portion of a first part 2 of a coupling is shown in FIG. 4. FIG. 4 shows the flow paths to the sensor outlet 11. The reference numbers refer to the features described above in relation to the coupling 1 described in relation to FIGS. 1, 2 and 3. The small portion of the first part 2 is essentially the same as that described above in relation to FIGS. 1, 2 and 3, apart from sensor channel 15 being provided with buffer reservoir 60. Buffer reservoir 60 comprises an expanded region in the form of a cylindrical chamber. The purpose of the buffer reservoir 60 is to reduce the risk of the sensor 50 being "triggered" in the event of a small and acceptable leak past the first seal member 4. In this connection, those skilled in the art will realise that seal members are not perfect and sometimes permit a small and acceptable amount of leakage therepast. In certain circumstances, such an acceptable leak past the first seal member may be sensed by the sensor, and indicate the presence of a leak. This is undesirable, and the buffer reservoir would effectively contain the small amount of fluid that leaks past the first seal member in the event of a "normal" and acceptable leak, and would prevent a rise is pressure that would be sensed by sensor 50. Those skilled in the art will realise that the buffer reservoir 60 may be any suitable shape, so long as the buffer reservoir 60 is of sufficient volume to reduce the risk of "normal" and acceptable leaks past the first seal member being detected by the sensor.

Those skilled in the art will realise that the sensor 50 is not necessarily part of the coupling of the present invention.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The example above describes the use of the coupling in an aircraft fuel system for the delivery of hydrogen fuel. Those skilled in the art will realise that use of the coupling is limited neither to fuel systems, nor vehicles.

The examples above demonstrate the use of a piston seal non-return valve. Those skilled in the art will realise that other non-return valves may be used. For example, flap or swing, disc, dual plate or ball-and-lift valves may be used.

The examples above demonstrate a coupling with two seals between the first and second coupling parts. Those skilled in the art will realise that other numbers of seals may be used. For example, while it is desirable to have two or more seals, in some circumstances it may be acceptable for only one seal to be used.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A coupling for coupling two or more portions of vacuum-insulated piping, the coupling comprising:
   first and second parts for forming the coupling,
   a first seal member for forming a seal between the first and second parts,
   each of the first and second parts comprising an inner portion for connection to an inner part of a respective portion of the vacuum-insulated piping and an outer portion for connection to an outer, low pressure part of the respective portion of the vacuum-insulated piping,
   the inner portions of the first and second parts being suitable for forming an inner region for the passage of fluid therethrough,
   the outer portion of the first part defining a first outer region and the outer portion of the second part defining a second outer region;
   a sensor outlet for a leak detection sensor;
   a first flow path for permitting flow of fluid from the inner region to the sensor outlet in the event of failure of the first seal member; and
   a second flow path for permitting flow of fluid from the first outer region or the second outer region to the sensor outlet in the event that the pressure in said first or second outer region is greater than a predetermined pressure, the second flow path being provided with a non-return valve for permitting flow of fluid from the respective first outer region or the second outer region to the sensor outlet in the event that the pressure in said first or second outer region is greater than a predetermined pressure, and inhibiting flow of fluid from the sensor outlet to the respective first or second outer region in the event that the pressure in said respective first or second outer region is at or below a predetermined pressure.

2. The coupling according to claim 1 wherein the first part or second part of the coupling is provided with the first flow path, the second flow path and the sensor outlet.

3. The coupling according to claim 2 wherein the first flow path is provided in the first or second part of the coupling that is not provided with the first seal member.

4. The coupling according to claim 1 wherein the first flow path comprises a continuous channel, such as an annular channel, located outward from the first seal member.

5. The coupling according to claim 4 wherein the first flow path comprises a connecting channel that forms a flow path from the continuous channel to the sensor outlet.

6. The coupling according to claim 1 wherein the second flow path comprises a conduit that forms a flow path to the sensor outlet, the non-return valve being located in the fluid flow path provided by the conduit.

7. The coupling according to claim 1 wherein the first and second flow path meet at a junction, a sensor channel forming a flow path from the junction to the sensor outlet.

8. The coupling according to claim 1 comprising a second seal member for forming a seal between the first and second parts.

9. The coupling according to claim 1, wherein one or both of the first and second parts of the coupling comprise an inner pipe portion for forming a connection with an inner pipe of the respective portion of the vacuum-insulated piping and an outer pipe portion for forming a connection with an outer pipe of the respective portion of the vacuum-insulated piping.

10. A kit, the kit comprising the coupling of claim 1.

11. The kit according to claim 10 comprising a sensor.

12. A vacuum-insulated piping arrangement comprising the respective portions of vacuum-insulated piping connected by the coupling in accordance with claim 1.

13. A fuel delivery arrangement comprising the vacuum-insulated piping arrangement according to claim 12 and one or more fuel tanks configured to deliver fuel to an engine or motor through the vacuum-insulated piping arrangement.

14. A vehicle comprising the fuel delivery arrangement according to claim 13, wherein the vehicle is a land-based vehicle or an aircraft.

15. A vehicle comprising the vacuum-insulated piping arrangement according to claim 12, wherein the vehicle is a land-based vehicle or an aircraft.

16. A coupling for vacuum-insulated pipes, the coupling comprising:
   a first coupling part and a second coupling part that couple together to provide the coupling,
   the first coupling part comprising a first central fluid-carrying space and a first outer space around the first central fluid-carrying space and for forming a thermally-insulating low-pressure region,
   the second coupling part comprising a second central fluid-carrying space around the second central fluid-carrying space for forming a second outer space for forming a thermally-insulating low-pressure region,
   the first and second central fluid-carrying spaces forming a passage for the flow of fluid therethrough when the first and second parts of the coupling are brought together,
   the coupling comprising a seal between the first and second parts of the coupling and for inhibiting egress of fluid from the passage,
   the first part of the coupling comprising a low-pressure leak detection path from the first outer space to a sensor outlet, a valve being provided in the low-pressure leak detection path for permitting fluid to flow from the first outer space to the sensor outlet in the event that the pressure in the first outer space exceeds a predetermined value;
   the first part of the coupling comprising a seal failure leak detection path to the sensor outlet for detecting failure of the seal.

* * * * *